(12) United States Patent
Louberg et al.

(10) Patent No.: US 7,019,682 B1
(45) Date of Patent: Mar. 28, 2006

(54) IMAGING MILLIMETER WAVE RADAR SYSTEM

(75) Inventors: John Louberg, San Diego, CA (US); Vladimir Kolinko, San Diego, CA (US); Eric Woodbridge, San Diego, CA (US); Robert C. Saunders, San Diego, CA (US)

(73) Assignee: Trex Enterprises Corp., San Diego, CA (US)

( * ) Notice: Subject to any disclaimer, the term of this patent is extended or adjusted under 35 U.S.C. 154(b) by 0 days.

(21) Appl. No.: 11/104,920

(22) Filed: Apr. 12, 2005

(51) Int. Cl.
*G01S 13/89* (2006.01)
*G01S 13/93* (2006.01)

(52) U.S. Cl. .............. 342/22; 342/175; 342/180; 342/181; 342/26 B (58) Field of Classification Search ............. 342/22, 342/25 A–25 E, 26 R, 26 A, 26 B, 27, 29, 342/89, 90, 175, 176, 179–183, 195, 197
See application file for complete search history.

(56) References Cited

U.S. PATENT DOCUMENTS

| | | | | |
|---|---|---|---|---|
| 4,654,666 A | * | 3/1987 | Wiley | 342/351 |
| 4,825,215 A | * | 4/1989 | Wiley | 342/351 |
| 5,053,781 A | * | 10/1991 | Milman | 342/351 |
| 5,121,124 A | * | 6/1992 | Spivey et al. | 342/179 |
| 5,365,237 A | * | 11/1994 | Johnson et al. | 342/179 |
| 6,680,698 B1 | * | 1/2004 | Eiges | 342/373 |

(Continued)

OTHER PUBLICATIONS

"Requirements for true time delay imaging systems with photonic components", Rotman, R.; Raz, O.; Tur, M.; Phased Array Systems and Technology, 2003. IEEE International Symposium on Oct. 14-17, 2003 Page(s): 193-198.*

"Clutter metrics for target detection systems", Tidhar, G.; Rotman, S.R.; Electrical and Electronics Engineers in Israel, 1991. Proceedings., 17th Convention of Mar. 5-7, 1991 Page(s): 166-169.*

*Primary Examiner*—John B. Sotomayor
(74) *Attorney, Agent, or Firm*—John R. Ross (57) ABSTRACT

An imaging millimeter wave radar system. The system includes a millimeter wave transmitter transmitting a frequency scanned millimeter beam that is narrow in the scanned direction and wide in a direction perpendicular to the scanned direction. The system includes a receive antenna and a Rotman type lens for forming a one-dimensional image in the perpendicular direction of targets in the antennas field of view based on millimeter wave radiation reflected from the targets. A computer creates a two dimensional image based on the scanning direction of the transmit beam of the transmit antenna and the one dimensional image from the receive antenna. Distance to the target is determined based on difference in frequency of the transmit signal and the receive signal. Thus, a three dimensional view of the systems field of view is determined by the system. This view can be displayed on a monitor using color to represent target distance. In a preferred embodiment the scanned direction is the vertical direction and the receive antenna forms a horizontal image from signals reflected from targets in the field of view. In this preferred embodiment the transmit antenna is a variable frequency millimeter wave single channel wave guide antenna operating in the 78 GHz to 81 Ghz spectral range to produce a scanning range of 10 degrees and a scanning rate of 60 Hz. The receive antenna is a multi-channel (176 channels) strip-line antenna also operating in the 78 GHz to 81 GHz spectral range, which with the Rotman lens, provides 192 horizontal pixel resolution.

10 Claims, 13 Drawing Sheets

U.S. PATENT DOCUMENTS

| | | | |
|---|---|---|---|
| 6,937,182 B1* | 8/2005 | Lovberg et al. | 342/22 |
| 2002/0171585 A1* | 11/2002 | Eiges | 342/373 |
| 2003/0022694 A1* | 1/2003 | Olsen et al. | 455/562 |
| 2004/0056790 A1* | 3/2004 | Lovberg et al. | 342/22 |
| 2004/0080448 A1* | 4/2004 | Lovberg et al. | 342/22 |
| 2005/0116947 A1* | 6/2005 | Lovberg et al. | 345/418 |

* cited by examiner

IMAGING MILLIMETER WAVE RADAR SYSTEM

The present invention relates to radar systems and in particular to wave imaging radar systems.

BACKGROUND OF THE INVENTION

Imaging systems operating at millimeter wavelengths (1 cm to 1 mm; 30 GHz to 300 GHz) are known. These systems can be important because light at these wavelengths is not completely attenuated by substantial distances of fog or smoke, as is visible light. Light at millimeter wavelengths will also penetrate clothing and significant thickness of materials such as dry wood and wallboard. These millimeter wave imaging systems have therefore been proposed for aircraft to improve visibility through fog and for security applications for detection of concealed weapons and the like.

Passive Millimeter Wave Imaging

Passive millimeter wave imaging systems are described in U.S. Pat. Nos. 5,121,124 and 5,365,237 that are assigned to Applicant's employer. The systems described in those patents utilize antennas in which the direction of collected millimeter wave radiation is a function of frequency. This type of antenna is referred to as a "frequency scanned" antenna. The collected millimeter wave light is analyzed in a spectrum analyzer to produce a one-dimensional image. In the systems described in the '124 patent the antenna signal is used to modulate an acousto-optic device (a Bragg cell) that in turn modulates a laser beam to produce a spectral image. In the systems described in the '237 patent an electro-optic module is modulated by the antenna signal and the electro-optic module in turn modulates the laser beam to impose the millimeter wave spectral information on a laser beam that then is separated into spectral components by an etalon to produce an image.

U.S. Pat. No. 4,654,666 describes an imaging system which includes a frequency scanning antenna and a spectrum analyzer for converting coded radiation distributions collected by the antenna into a time coded distribution so that a one-dimensional scene can be reproduced. All of the above identified patent applications are hereby incorporated by reference along with the following patent applications: Ser. No. 10/728,432 filed Dec. 8, 2003, Ser. No. 09/965,875 filed Sep. 29, 2001, and Ser. No. 10/639,322 filed Aug. 12, 2003.

Radar System

Radar system operating millimeter frequencies are known. These systems typically modulate a millimeter wave signal with a two or more lower frequency signals (called frequency shift keying or FSK) or with a linearly changing (ramping up or ramping down in frequency) lower frequency signals (called linear frequency modulated LFM). And combinations of FSK and LFM have been proposed. These FSK and LFM systems have been proposed for autonomous motor vehicle control and motor vehicle collision avoidance. Some of the systems provide techniques for angular scanning of either the transmit beam or the receive beam or both. In general angular resolution with these systems is poor and typically they are too slow for many hazard avoidance applications.

Hazard Detection

Aircraft are typically equipped with radar devices for detection of hazards; however, at the frequencies of most radar very thin objects such as power lines and some towers do not show up on typical radar screens. Helicopters are at risk especially when flying low to the ground to avoid potential enemy rocket fire. Helicopters attempting to land in sandy places create small dust storms that reduce or eliminate visibility. What is needed is an imaging radar system especially on suitable for use for hazard avoidance.

SUMMARY OF THE INVENTION

The present invention provides an imaging millimeter wave radar system. The system includes a millimeter wave transmitter transmitting a frequency scanned millimeter beam that is narrow in the scanned direction and wide in a direction perpendicular to the scanned direction. The system includes a receive antenna and a Rotman type lens for forming a one-dimensional image in the perpendicular direction of targets in the antennas field of view based on millimeter wave radiation reflected from the targets. A computer creates a two dimensional image based on the scanning direction of the transmit beam of the transmit antenna and the one dimensional image from the receive antenna. Distance to the target is determined based on difference in frequency of the transmit signal and the receive signal. Thus, a three dimensional view of the systems field of view is determined by the system. This view can be displayed on a monitor using color to represent target distance. In a preferred embodiment the scanned direction is the vertical direction and the receive antenna forms a horizontal image from signals reflected from targets in the field of view. In this preferred embodiment the transmit antenna is a variable frequency millimeter wave single channel wave guide antenna operating in the 78 GHz to 81 Ghz spectral range to produce a scanning range of 10 degrees and a scanning rate of 60 Hz. The receive antenna is a multichannel (176 channels) strip-line antenna also operating in the 78 GHz to 81 GHz spectral range, which with the Rotman lens, provides 192 horizontal pixel resolution.

BRIEF DESCRIPTION OF THE DRAWINGS

FIG. 5B(1) shows a vertical view of transmit beam shapes over a 10 degree scan range.

FIG. 5B(2) shows the beam shape of the receive antenna for receiving signals at a single frequency (81 GHz) reflected from targets in a single direction.

DETAILED DESCRIPTION OF PREFERRED EMBODIMENTS

First Preferred Embodiment

A first preferred embodiment of the present invention is described in FIGS. 1 through 5D. It is an active illuminator married with a passive millimeter wave camera. This embodiment is a three dimensional W-band frequency modulated continuous wave (FMCW) active imaging radar system. It includes a frequency-scanned, phased-array receive antenna; a single-element, frequency-scanned transmit antenna and a 192-tap Rotman lens. The system employs a linear frequency modulated chirp radio frequency waveform sweeping from 78 to 81 GHz in 16.7 msec (60 Hz scan frequency) for a scan rate of 180 GHz/sec. The system provides the following capabilities:

1. Operational range: 30 m to 1000 m.
2. Hazard detection range: >500 m (⅜-inch wire @ 60° oblique angle).
3. Field of view: 90° azimuth×10° elevation.
4. Range resolution: 5 m.
5. Cross-range spatial resolution: 9 mrad (5°) @ boresight.
6. Transmitter frequency: chirped, 78 to 81 GHz.
7. Transmitter power: 5 W.
8. Imaging aperture size: 0.38 m square (serpentine).
9. Antenna polarization: horizontal.
10. Image sample rate: 60 Hz.
11. Display update rate: 30 Hz.

The receive antenna is a serpentine stripline slot array with a steering range of 10.50 to 20.5° off broadside. The transmit antenna is a single-element, slotted rectangular waveguide. The Rotman lens has 192 cross-range output ports and provides the azimuthal coverage (192 azimuth bins). The elevation coverage (22 elevation bins) is provided by sweeping the beam vertically via sweeping frequency to the frequency-scanned transmit and receive antennas. The FMCW radar provides the range coverage by Fourier transforming the dechirped received waveform echo and segregating the data into range bins for display and storage.

In the Frequency Source Module, a dielectric resonator oscillator at 18.375 GHz is frequency-multiplied by 2 to generate an LO signal at 36.75 GHz. This LO signal is fed to a harmonic mixer in the Heterodyne Converter Module, where its second harmonic at 73.5 GHz is used to downconvert the received 78 to 81 GHz waveform to 4.5 to 7.5 GHz. This 4.5 to 7.5 GHz waveform is then mixed with the VCO signal in the Superheterodyne Baseband Downconverter Module to generate the baseband IF signal. The baseband IF signal is high-pass filtered to limit the lower range and low-pass filtered to limit the upper range and then fed to the Signal Processing Module for windowing, fast Fourier transformation, threshold determination, display, and storage.

To detect wires along the flight path of a rotary-wing aircraft, the FMCW phased-array imaging radar produces a three dimensional map of objects in front of the aircraft, operating out to approximately 1000 m. The radar images over a field-of-view of about 10 degrees in elevation by about 90 degrees in azimuth, at a 60-Hz image update rate. The radar returns are processed using a linear, 192-pixel detector array with an 11-mrad angular resolution, and will be displayed in color on a 192×22 pixel raster display. The radar is capable of detecting a ⅜-inch wire from a distance of at least 500 meters, at obliqueness angles between normal and 60 degrees off-normal. This capability is maintained in fog conditions, and even in very heavy rain the range performance is compromised only for large obliqueness angles.

The 3-D imaging radar is designed to detect hazards as small as a ⅜-inch wire, at high obliqueness angles, to a range of at least 500 meters. The transmitter scans a frequency source between 78 and 81 GHz, with a frequency-scanned antenna distributing the frequencies selectively along the elevation axis. At a 500-meter range, the power from the 38-cm long by 0.22-cm wide frequency-scanned transmitting antenna element illuminates a fan beam covering about 6,300 m² (1,400 m azimuth×4.5 m elevation) instantaneously and sweeping in elevation to cover a total of 140,000 m² (1,400 m azimuth×100 m total elevation) in front of the aircraft. From the same range, the forward-looking spatial resolution of the 3-D imaging radar receiver is 20 m² (4.5 m×4.5 m).

The 3-D imaging radar uses a frequency-scanned, phased-array imaging antenna, receiver, and beam-former technology. The preferred receive antenna is a flat panel slotted strip-line antenna, 38-cm (15-in.) square with 34,500 (150 horizontal×230 vertical) slots. This antenna has 176 channels that and a Rotman lens that focuses millimeter wave radiation received in the horizontal (azimuthal) direction on 192 cross-range output ports. Each output will sample one azimuthal beam of the imaging radar at its 9-milliradian cross-range resolution with azimuthal 192 pixels.

A single-element, frequency-scanned transmit antenna is fed by a tuned frequency source chirping from 78 GHz to 81 GHz. The return signal from each Rotman (cross-range) port will be mixed with the transmitter oscillator, such that the intermediate beat frequency measures the two-way time of flight of the transmitted signal.

To achieve the lowest possible phase noise, the envisioned transmitter source is a fixed-frequency DRO at 18.375 GHz, locked to an ultra-stable 10 MHz crystal reference source, doubled to 36.75 GHz and then doubled again to 73.5 GHz and then mixed up to the 78–81 GHz band using a 4.5–7.5 GHz VCO. This source is then amplified using an E-band HBT grid-array power amplifier. The transmitter is chirped following a 60 Hz sawtooth waveform, generating a frequency sweep rate of 180 GHz/sec. At this chirp speed, a hazard at a range of 500 meters will return an IF beat frequency of 600 KHz.

A thin wire crossing the radar field of view is sub-resolved in the elevation direction. A ⅜-inch (1-cm) wire represents about a 0.2% fill factor relative to the antenna resolution spot-size at 500 meters. Using a +37 dBm (5 Watt) source and a 15-inch long WR-12 waveguide antenna with narrow-wall inclined shunt slots, the power density illuminating a wire in the forward direction at a distance of 500 meters in clear weather is about 0 dBm/m². The radar cross-section $\sigma(\theta)$ of the wire varies strongly as a function of obliqueness angle of approach, from −23.2 dB(m²) at 10 to −37.2 dB(m²) at 5°, and then to −43.3, −53, and −60 dB(m²) at 10°, 30°, and 60° respectively. The effective area of the receiver antenna is −9 dB(m²). The noise floor in the 2 kHz resolution bandwidth of the radar imager is −134 dBm, assuming a receiver noise figure of 7 dB. Time-on-target for the 69 Hz chirp rate is 1.1 ms, well-matched to the resolution bandwidth of the radar.

Two-way weather-related atmospheric losses at 500 meter target ranges are negligible for fog and clouds but range from 0 to 40 dB in rainy conditions (0 to 135 mm/hr). The design parameters given in the previous paragraph result in rain fade margins for unity signal-to-noise ratio of $60\sigma(\theta)$ dB. As a function of obliqueness angle, and tabulated with corresponding rain rates, the fade limits for detection of small-wire hazards at 500 meters are shown in table 1 below.

| Obliqueness | Fade Margin | Max Rain Rate |
|---|---|---|
| 1° | 36.8 dB | 122 mm/hr |
| 5° | 22.8 dB | 66 mm/hr |
| 10° | 16.7 dB | 44 mm/hr |
| 30° | 7 dB | 14 mm/hr |
| 60° | 0 dB | 0 mm/hr |

At rain rates lower than those listed in the table, or for shorter distances or longer wires, the signal-to-noise ratio of a hazard return is larger than unity. However, since the radar samples 2 sweeps per image update period (at 30 Hz update), and the imager detects a multiplicity of independent pixels per sweep for each individual wire hazard, the probability of hazard detection is extremely high, and the probability of false alarm extremely low, even at threshold conditions.

Radar Range Processing

The scanning fan beam passes through each of the 22 elevation bins in approximately 0.8 milliseconds, as the transmitter chirp passes through the frequency range corresponding to that location. During this period, the imager records a 192-pixel cross-range obstacle map at that elevation. After 16.7 milliseconds, the full 192×22 pixel image is swept out.

Signal down-conversion is performed in two steps to eliminate phase noise contributions from self-mixing of the local oscillator. The first intermediate frequency is generated by mixing a second harmonic of the return signal with the fixed 36.75 GHz LO, to return an output between 4.5 and 7.5 GHz. This signal is then mixed with the VCO signal to generate the baseband intermediate frequency. The intermediate frequency is low-pass filtered at 1.3 MHz, limiting the operational range of the radar to 1.0 km, so that specular reflections from large targets at greater ranges (frequencies over 1.4 MHz) do not generate aliases in the FFT and show up at closer ranges. High-pass filtering the intermediate frequency at 35 kHz (30 m range) filters large returns from close-in targets prior to the limiting intermediate frequency amplifier and digitizer.

Design details such as antenna size, elevation field of view (FOV) and azimuth FOV have been chosen to form a self-consistent conceptual picture of a hazard-avoidance radar as a feasibility assessment. Any or all of these parameters can be modified to meet a specified requirement.

Over the 0.8 millisecond dwell time of the fan beam at each elevation position, the intermediate frequency signal is analyzed at each of the 192 Rotman ports. To achieve a maximum range of 1.0 km, the intermediate signal is digitized to a 14-bit depth at 2.5 Msamples per second. The preferred embodiment, to achieve a 4 meter range resolution corresponding to a 4.8 KHz frequency resolution, the Fast Fourier Transform (FFT) processor processes in sets of 512 samples using a complex 256 point processor with pre-sorting and post data segregation to effectively achieve a 512 point transform. Four consecutive results are then summed to form one elevation bin for signal to noise improvement. The corresponding results from two consecutive sweeps would then be combined for signal to noise improvement before display.

Higher range resolution can be achieved, up to about 1.5 meters corresponding to 1.8 KHz. For this implementation the FFT processor would process is sets of 4096 samples with each result representing one elevation bin. The corresponding results from two consecutive sweeps would then be combined for signal to noise improvement before display as before.

Preferred embodiments utilize E-band grid amplifiers to amplify the output power of the transmit beam. Without the E-band power amplifier, output power of 50 mW can be achieved using a low-power voltage-controlled oscillator at 4.75–5.06 GHz, a 16× multiplier, and a medium-power MMIC amplifier (power-combined Raytheon MHEMT MMIC. Without the LNAs, the receiver noise figure jumps from 7 dB to about 23 dB. The overall reduction in the power budget relative to the proposed military system is 36 dB. Clear-weather detection range of a ⅜-inch wire as a function of obliqueness angle is projected for this low-cost demonstrator in table 2 below.

| Obliqueness | Detection Range |
|---|---|
| 1° | 526 m |
| 5° | 235 m |
| 10° | 165 m |
| 30° | 95 m |
| 60° | 63 m |

Electronic Design

Figure 1:
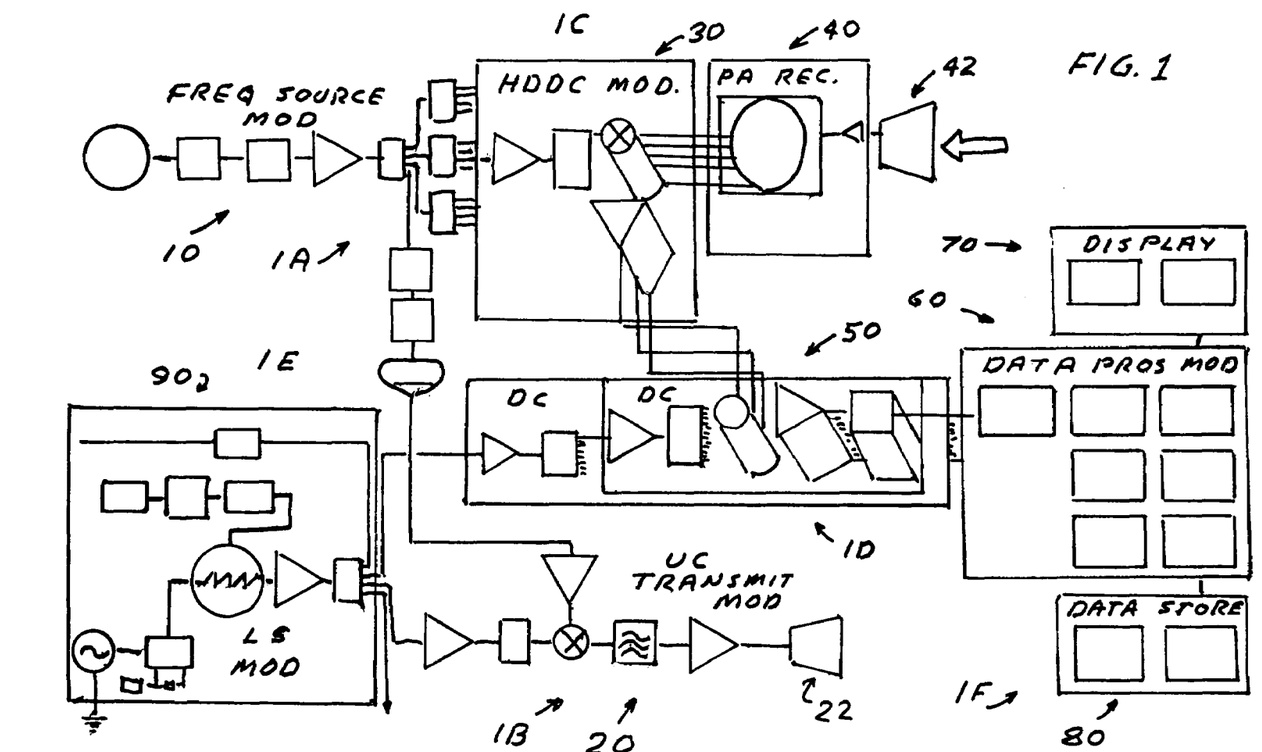
FIGS. 1 and 1A through 1E describe the electro-optical design of a preferred embodiment of the present invention.
Figure 1A:
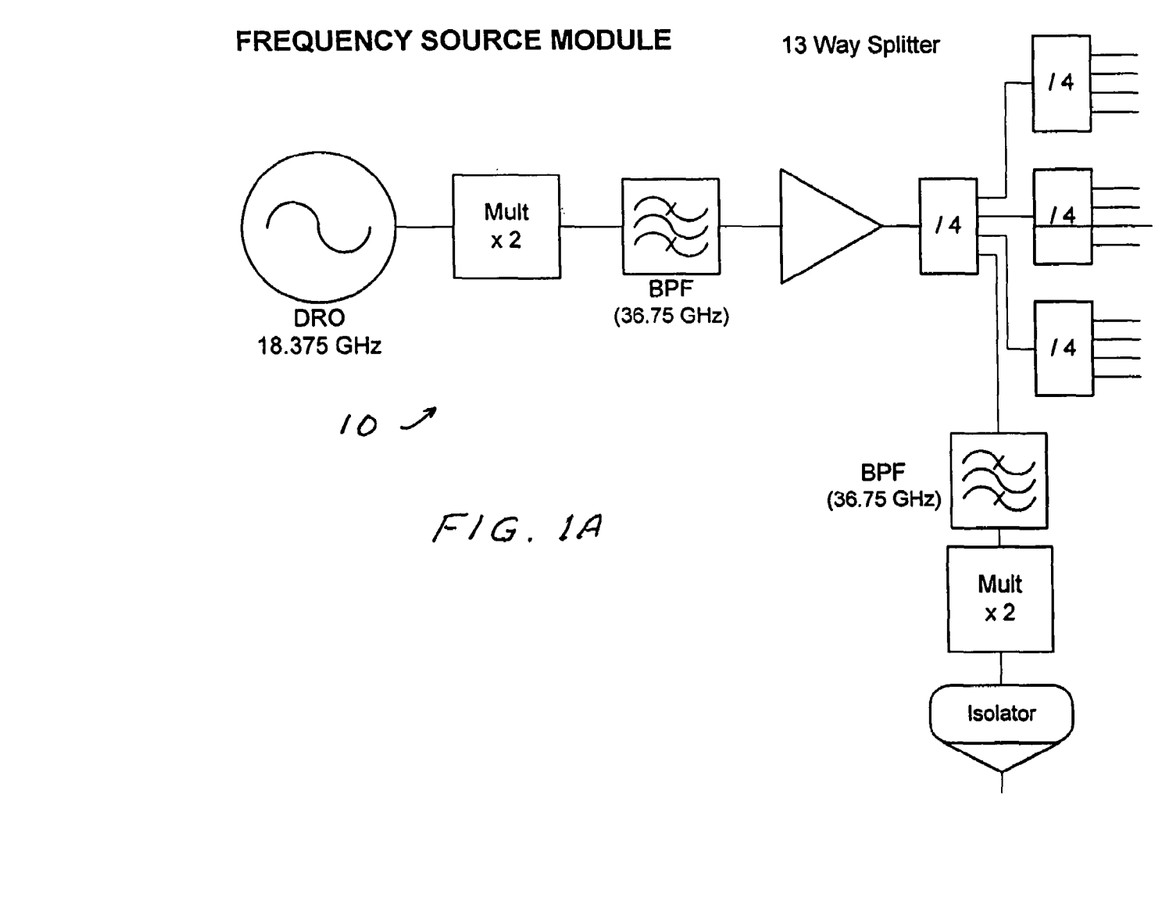
Figure 1B:
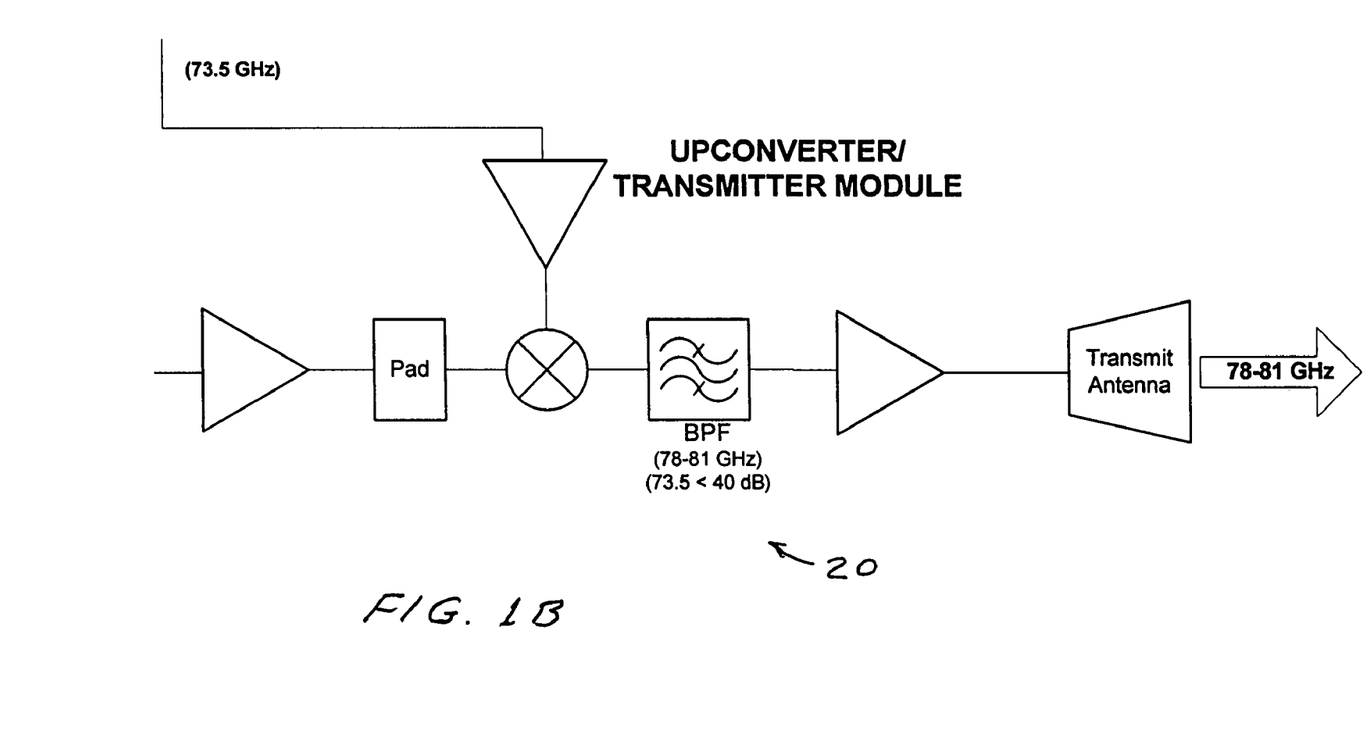
Figure 1C:
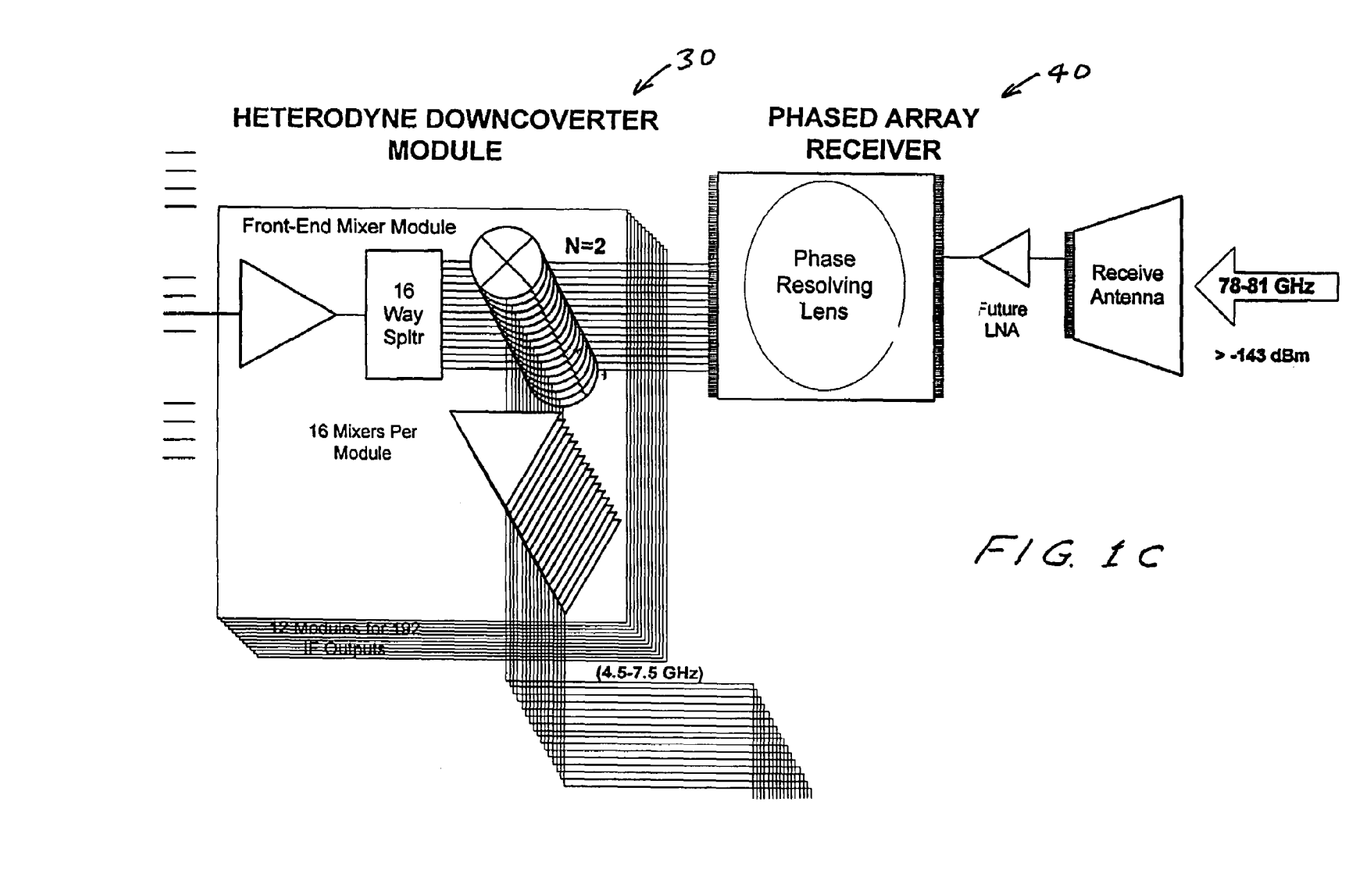
Figure 1D:
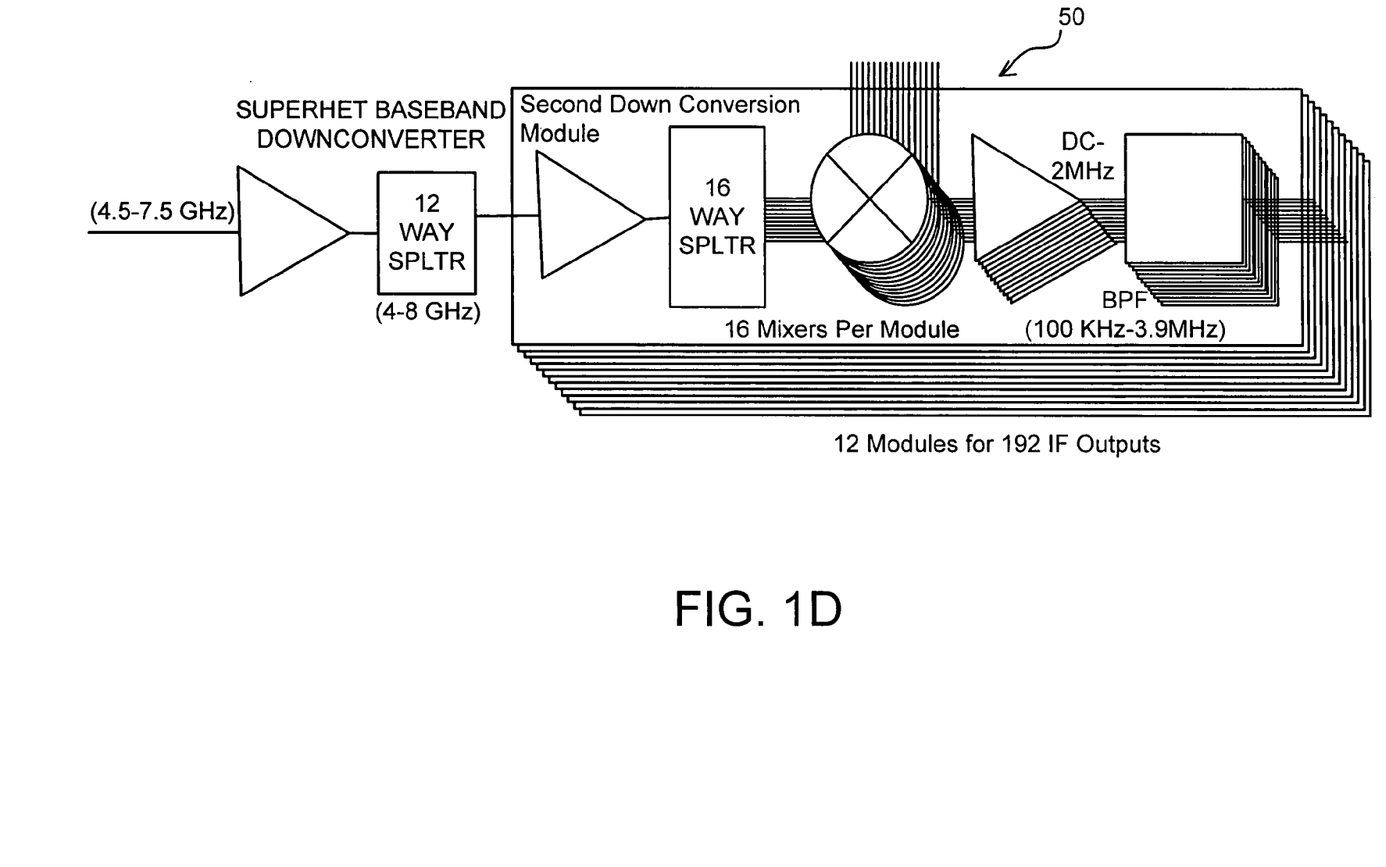
Figure 1E:
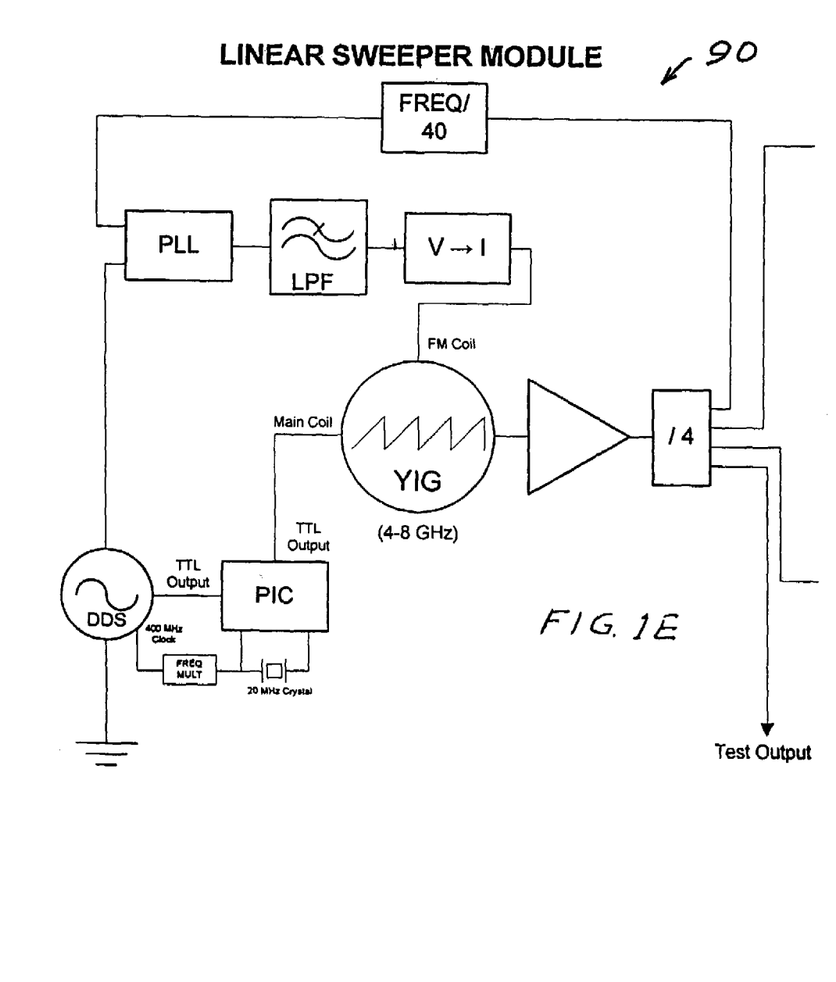
Figure 1F:
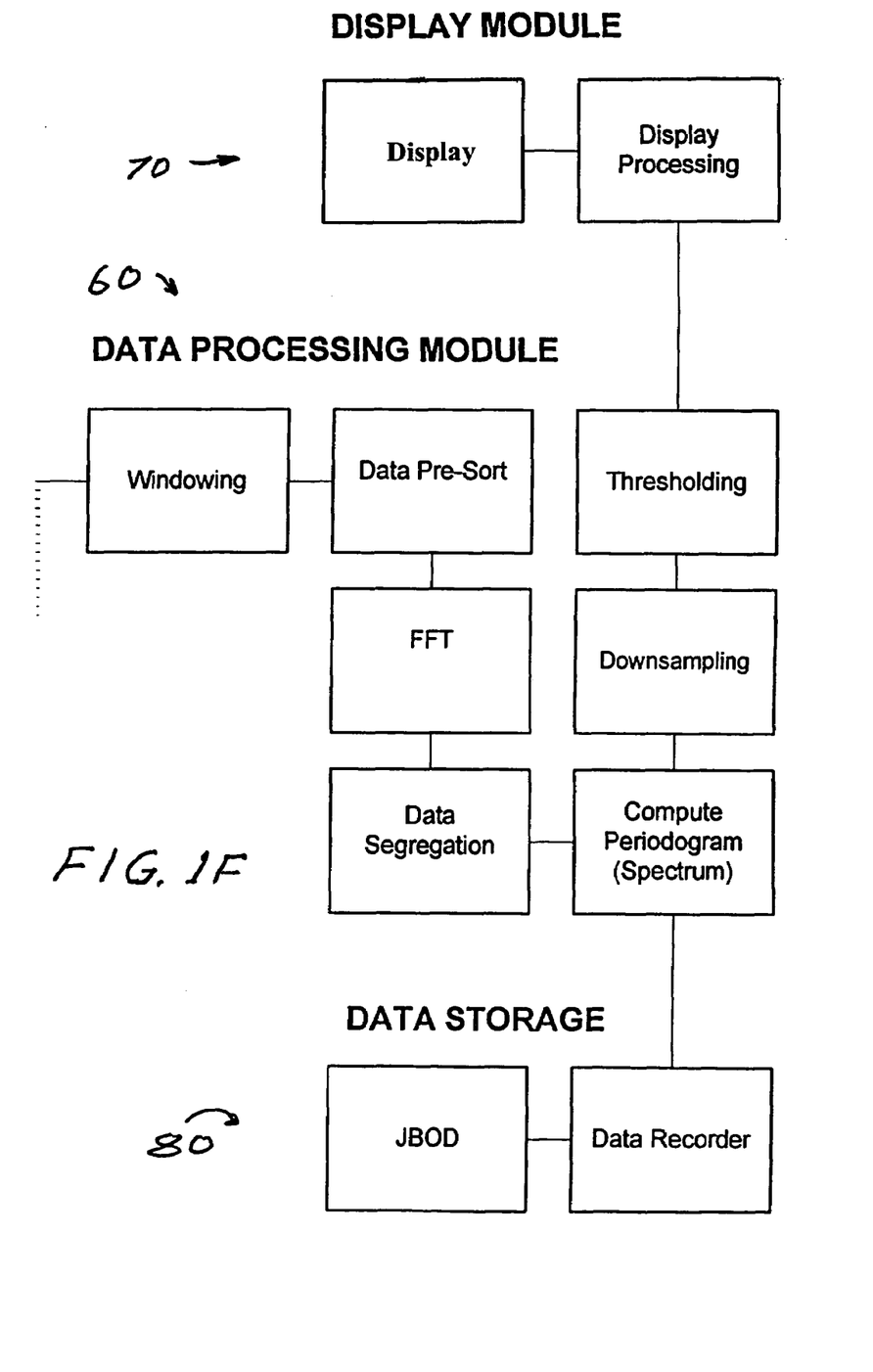

FIGS. 1 and 1A through 1E describe the electrical design of a preferred embodiment of the present invention. This design includes frequency source module 10 shown in FIGS. 1 and 1A; up-converter transmitter module 20 and transmit antenna 22 are shown in FIGS. 1 and 1B; heterodyne down-converter module 30, phased array receiver 40 and receive antenna 42 are shown in FIGS. 1 and 1C; superhet baseline down-converter module 50 shown in FIGS. 1 and 1D; linear sweeper module 90 shown in FIGS. 1 and 1E; data processing module 60, display module 70 and data storage unit 80 are shown in FIGS. 1 and 1F.

Figure 2:
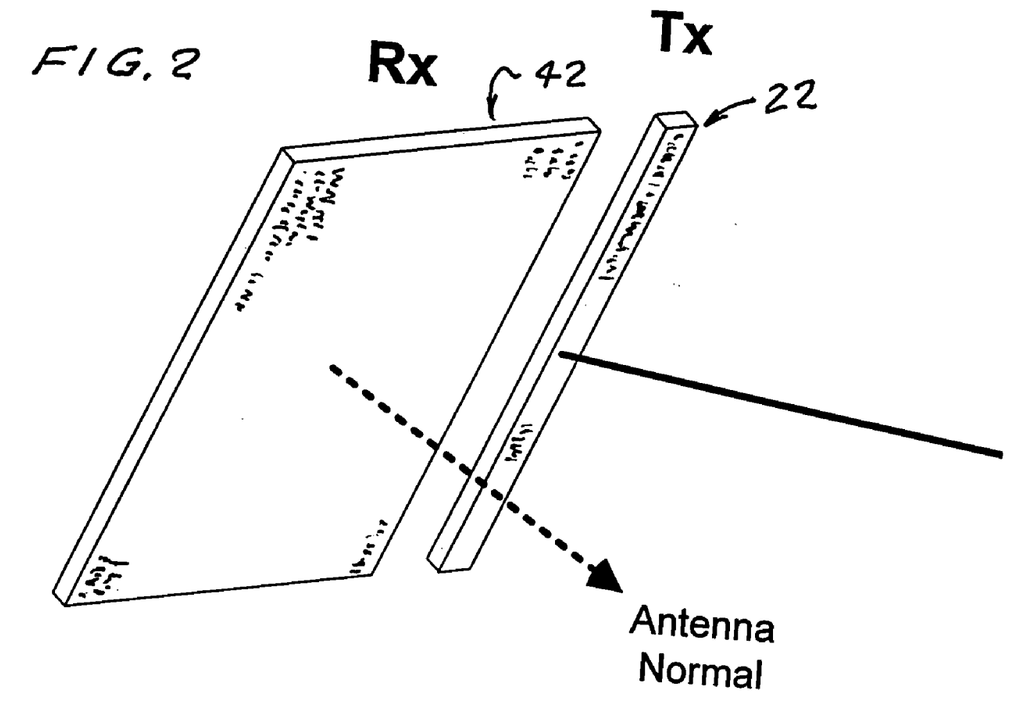
FIG. 2 is a sketch of transmit and receive antennas of the preferred embodiment.
Figure 3:
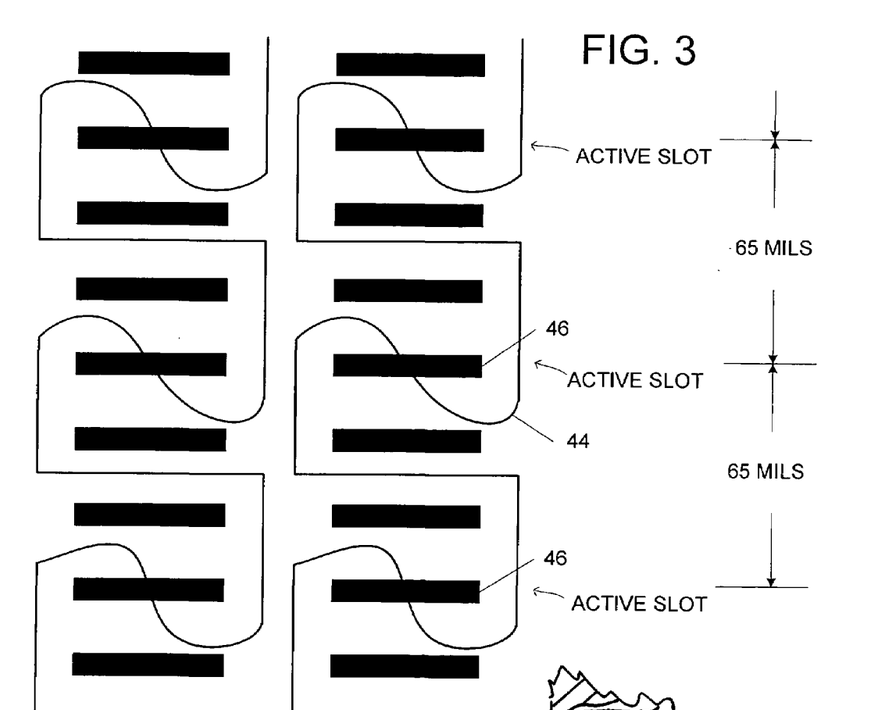
FIG. 3 shows details of the design of the strip-line circuitry of the receive antenna.

FIG. 2 is a sketch of transmit antenna 22 and receive antenna 42. FIG. 3 shows details of the design of the strip-line circuitry of receive antenna 42. This drawing shows curving strip-line 44 and active slots 46. The active slots are spaced 65 mills apart in the vertical direction as indicated on FIG. 3. This corresponds to about two wavelengths of the millimeter wave radiation that would produce a beam perpendicular to the antenna face. Millimeter wave radiation at slightly different frequencies (wavelengths) will be transmitted and received at angles slightly different from perpendicular. Between each active slot are two inactive slots that are included to allow stray radiation to exit the antenna.

Figure 4:
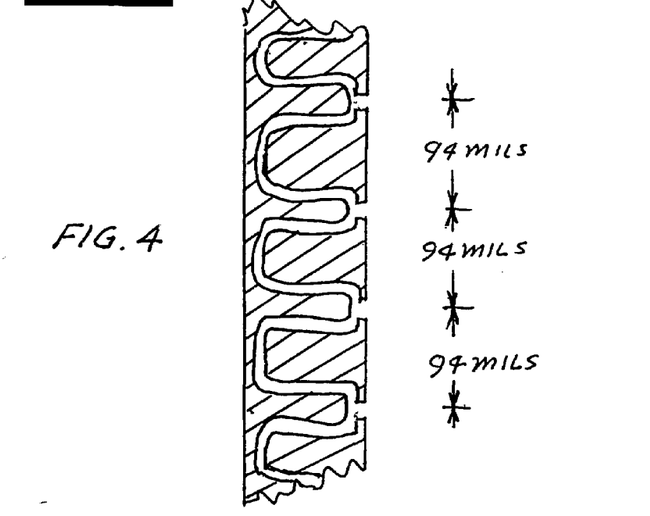
FIG. 4 shows details of the design of the wave guide circuitry of the transmit antenna.

FIG. 4 shows details of the design of the wave guide circuitry of the transmit antenna 22. the waveguide is shown at 24. Slots are spaced at 94 mills. This also corresponds to two wavelength of the millimeter wave radiation that would produce a perpendicular beam.

Figure 5:
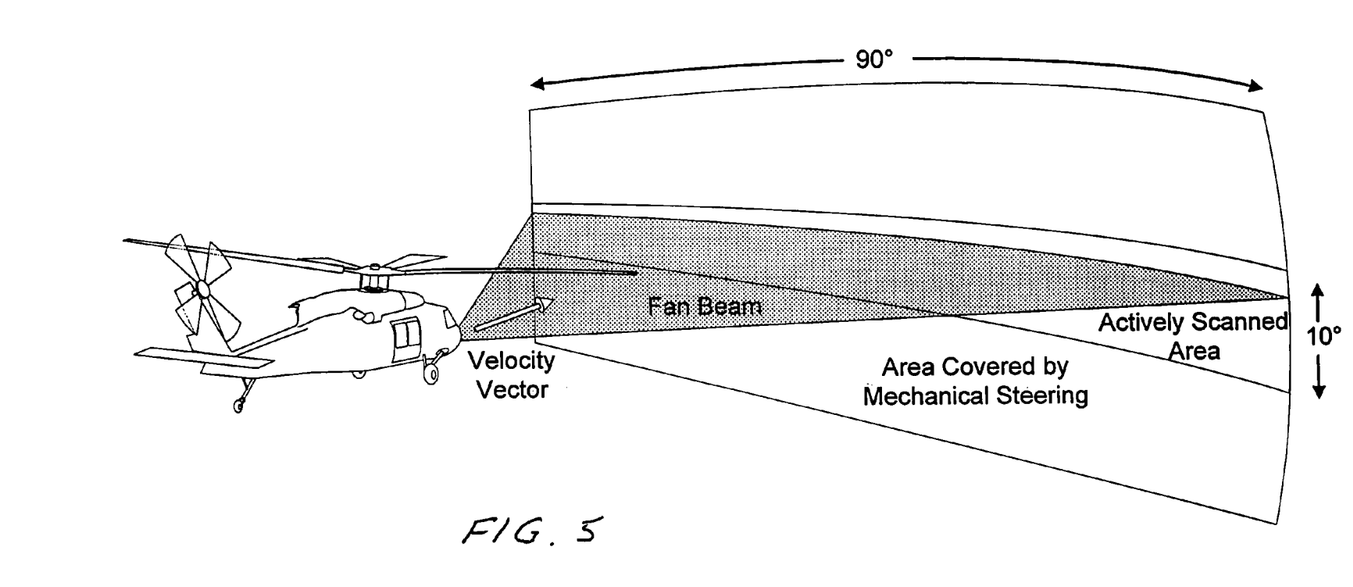
FIG. 5 shows a fan beam being transmitted for the transmit antenna mounted on a helicopter.
Figure 5A:
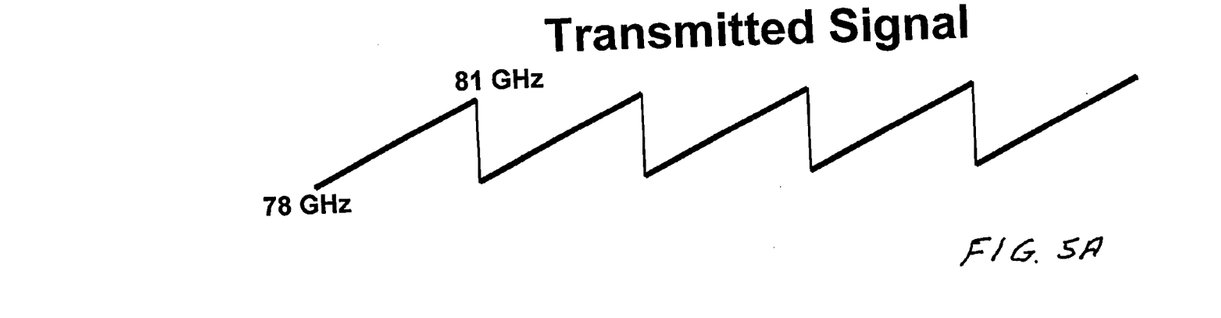
FIG. 5A shows the shape of a saw-tooth transmit beam being scanned between 78 GHz and 81 GHz.
Figure 5B:
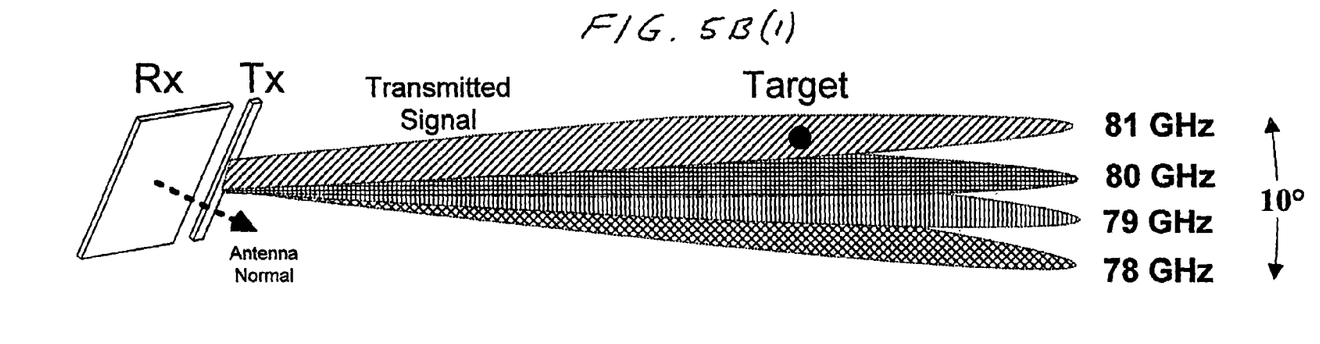

FIG. 5 shows a fan beam being transmitted for the transmit antenna mounted on a helicopter. As indicated above the instantaneous beam is about 0.7 degrees in the vertical and 90 degrees in the horizontal. It is scanned 10 degrees as shown in FIG. 5 as the millimeter wave signal is scanned from 78 GHz to 81 GHz at 60 Hz as shown in FIG.

5A. FIG. 5B(1) shows the general shape of side view of the transmit beam and FIG. 5B(2) shows the beam shape of the receive antenna for receiving signals at a single frequency (81 GHz) reflected from targets in a single direction.

Figure 5C:
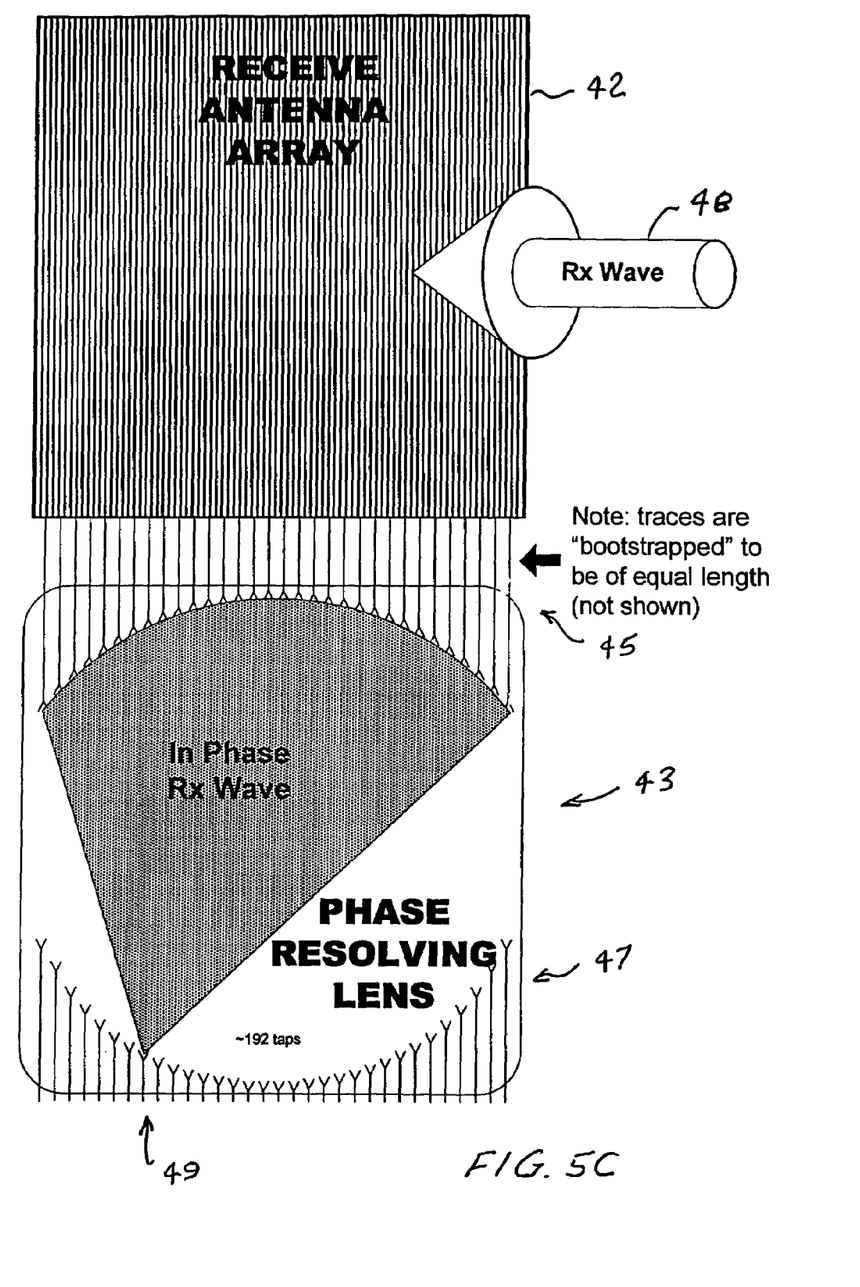
FIG. 5C shows how the receive antenna form a one dimensional image in the horizontal direction of targets in the in the field of view at elevations corresponding to the direction of transmit antenna beam direction.

FIG. 5C shows how receive antenna 42 forms a one dimensional image in the horizontal direction of targets in the in the field of view at elevations corresponding to the direction of transmit antenna beam direction. A radio wave 48 is depicted illuminating the face of antenna 42 from a azimuthal angle. The energy from the wave is collected in slots 46 and transmitted through "bootstrapped" traces 45 (all of which are the same length) to Rotman lens 43. Rotman lens 43 focuses the millimeter wave radiation 48 onto exit tap 49 which is one of 192 exit taps of the lens 43.

Figure 5D:
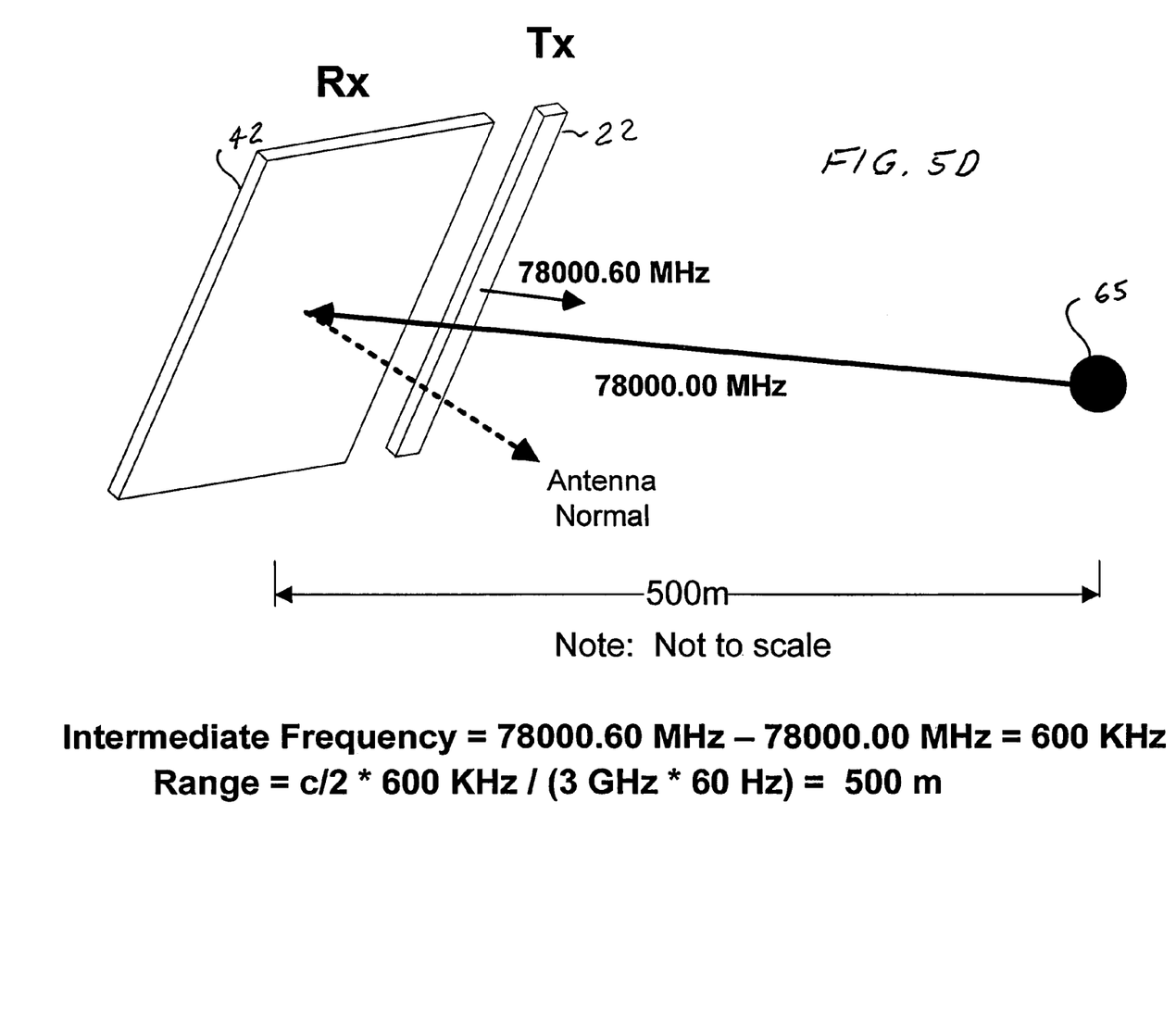
FIG. 5D shows how distance is determined by the system.

FIG. 5D provides an example showing how distance is determined by the system. In this example a beam transmitted at 78000.00 MHz is reflected from target 65 and the reflected signal is detected 3.3 micro-seconds later by receive antenna 42. By this time the frequency being transmitted by transmit antenna 22 is at 78000.60 MHz. The difference frequency is determined and converted to a distance of 500 m as shown by the calculation in FIG. 5D.

Second Preferred Embodiment

A second preferred embodiment of the present invention is useful for imaging at close distances with very poor visibility such as heavy fog or dust conditions. One such situation arises when attempting to land a helicopter in on a sandy or dusty field. The major changes in the radar's operational requirements relative to the first embodiment are those of significantly decreased operating range and significantly increased range resolution. Shorter ranges and larger return cross-sections lead to simplifications of the transmitter design, particularly in eliminating the need for a high-power millimeter-wave (MMW) amplifier, and of the receiver design, in eliminating the need for a low-noise MMW phased array receiver. On the other hand, the shorter operational range, as well as the need for greatly increased range resolution, limits the size of the antenna aperture that can be utilized and thus restricts the angular resolution of the radar. By returning to first principles of the radar design, these tradeoffs become most clear.

Range Resolution

The range resolution of the radar is ultimately related only to the sampling period of the radar antenna. This is made evident by matching the transmit beam's time on target to the sampling period of the return signal through the Fast Fourier Transform (FFT) processor. The FFT period in turn dictates the frequency resolution of the processor, which sets the range resolution of the FMCW radar.

The number of antenna beam-widths $N_{beams}$ scanned by a frequency-scanned antenna is given by the product of the transmit bandwidth $\Delta v$ and the signal propagation period in the antenna, $\tau_{ant}$. The time that the transmit beam dwells on a small target $\tau_{target}$ is the ratio of the scan time $\tau_{scan}$ and the number of beams scanned, such that:

$$\tau_{target} = \frac{\tau_{scan}}{N_{beams}} = \frac{\tau_{scan}}{\Delta v \tau_{ant}}. \tag{1}$$

For the FMCW radar, range resolution is maximized by utilizing the entire time on target in the FFT processor. The frequency resolution $\delta v_{FFT}$ of the processor, which is given by the inverse of this sampling time, is divided by the frequency chirp rate ($\Delta \sigma / \tau_{scan}$) to determine the smallest differential in two-way time-of-flight $\delta \tau_{tof}$ (and thus differential range $\delta R$) that can be distinguished by the radar, as follows:

$$\delta v_{FFT} = \frac{1}{\tau_{FFT}}; \tag{2}$$

$$\delta \tau_{tof} = \delta v_{FFT}\left(\frac{\tau_{scan}}{\Delta v}\right) = \frac{1}{\Delta v}\left(\frac{\tau_{scan}}{\tau_{FFT}}\right) \Rightarrow \delta R = \frac{c}{2\delta \tau_{tof}} = \frac{c\Delta v}{2}\left(\frac{\tau_{FFT}}{\tau_{scan}}\right).$$

Equating the transmit beam's time on target with the FFT sampling time, we substitute equation 1 into equation 2 to get:

$$\delta R = \frac{c\Delta v}{2}\left(\frac{\tau_{target}}{\tau_{scan}}\right) = \frac{c}{2\tau_{ant}}. \tag{3}$$

This simple relationship verifies the intuitive conclusion that the smallest two-way time-of-flight differential that can be measured by the radar is equal to the instantaneous sampling period of the antenna. The sampling period of the antenna is related to the length D of the traveling-wave antenna through the relation:

$$\tau_{ant} = \frac{D}{v_{prop}},$$

where $v_{prop}$ is the signal propagation speed in the antenna. Rewriting equation (3) in terms of antenna size and speed:

$$\delta R = \frac{c}{v_{prop}}\left(\frac{D}{2}\right). \tag{4}$$

Thus higher range resolution is obtained either by shrinking the antenna (thereby degrading cross-range resolution) or by increasing propagation speed (thereby decreasing radar FOV in the scan direction, as will be discussed below).

Frequency Scan Field of View

The radar's electronically-scanned field of view (FOV) is given by the product of the number of beams scanned and the width of these beams. Near broadside, for transmit wavelength $\lambda$, the antenna's diffraction limited beamwidth is simply $\lambda / D$, and the FOV becomes:

$$FOV = N_{beams}\left(\frac{\lambda}{D}\right) = \Delta v \tau_{ant}\left(\frac{\lambda}{D}\right) = \frac{c}{v_{prop}}\left(\frac{\Delta v}{v}\right). \tag{5}$$

Here c is the speed of light in a vacuum and ($\Delta v$ Iv) is the fractional bandwidth of the transmitter. For a fixed fractional bandwidth, then, increasing antenna propagation speed as a means of increasing range resolution (by way of equation 4) reduces the electronically-scanned field of view of the radar.

Operating Band

In instances where the radar's cross-range resolution requirement precludes shrinking the antenna length and an increase in antenna propagation speed becomes the only option for increased range resolution, it may be desirable to find a way to increase the radar's fractional bandwidth. For the hazard avoidance radar design, the assumption was made that the W-Band 78–81 GHz radiolocation band was preferable to the V-Band 57–64 GHz license-free band because the operating ranges and required signal power levels were inconsistent with atmospheric oxygen absorption and regulated transmit power restrictions in the lower band. As a landing aid in brownout conditions, however, the ranges and power levels are well-suited to V-Band operation, and the available fractional bandwidth is 3 times greater.

Radar Front End Design

The impact of modifying the baseline radar design from W-Band to V-band is relatively minor, since the proof-of-concept radar has no RF amplifiers. The transmitter, originally configured using a 4x-multiplied oscillator at 18.375 GHz mixed with a 4.5–7.5 GHz VCO and fed into a 15" slotted, serpentine WR-12 waveguide antenna, becomes instead a 4x-multiplied 12.125 GHz source mixed with a 8.5–15.5 GHz VCO and fed into an 8" slotted, straight WR-15 waveguide antenna. The VCO chirp rate is increased from 60 Hz to 720 Hz. The receive antenna, originally configured as a 15"×15" phased array of serpentine striplines with radiating slots at 66.5 mil intervals in polypropylene, becomes an 8"×8" phased array of straight striplines with radiating slots at 118 mil spacing in the same polypropylene substrate. The phase processor is likewise reduced in size, with 80 input taps rather than 176, and 96 output taps rather than 192.

With no additional changes in the mixer or IF circuitry, the range resolution of the radar is increased from 1 range bin per 4 meters (hazard avoidance design) to 1 range bin per 0.15 meters. At the chirp speed of 5.04 THz/sec, the 5 kHz frequency resolution of the existing FFT processor design yields a range resolution of 15 centimeters. The frequency-scanned and phased array fields of view stay at 10 degrees and 90 degrees respectively, but the smaller antenna results in a decrease in cross-range resolution from 1 beamwidth per 0.7 deg (hazard avoidance design) to 1 beamwidth per 1.2 degrees. A rectangular antenna, wider in the phased-array direction than the frequency-scanned direction, can be implemented to recover angular resolution in one dimension.

While the present invention has been described above in terms of particular embodiment, persons skilled in the art will recognize that many other changes may be made. For example, in addition to using the system for helicopter wire avoidance and landing in dusty or sandy locations, the system can be applied to automatic or remote vehicle control and to motor vehicle collision avoidance. The system could also be applied to fixed-wing aircraft for hazard avoidance and landing assist in bad weather or smoke conditions. Fewer pixels such as about 10 in the receive antenna could be provided where good resolution is not needed. The transmit antenna could be built with strip-line design as in the receive antenna and the receive antenna could be built using the wave guide approach. Therefore, the scope of the present invention should be determined by the appended claims and their legal equivalents.

We claim:

1. An imaging millimeter wave radar system comprising:
   A) a millimeter wave transmit antenna transmitting a frequency scanned millimeter beam that is narrow in the scanned direction and wide in a direction perpendicular to the scanned direction;
   B) a receive antenna comprising a Rotman-type lens system for forming a one-dimensional image in the perpendicular direction of targets in the receive antenna field of view based on millimeter wave radiation transmitted by said transmit antenna and reflected from the targets;
   C) a computer processor for creating a three-dimensional image information based on:
      1) the scanning direction of the transmit beam of the transmit antenna,
      2) the one-dimensional images from the receive antenna, and
      3) distances to the targets based on differences in frequency of the transmit signal and the receive signal.

2. The system as in claim 1 and further comprising a monitor for displaying three-dimensional images based on said three-dimensional image information.

3. The system as in claim 1 wherein said computer processor is programmed with software to display distances to targets as colors.

4. The system as in claim 1 wherein said transmit antenna is a single channel slotted waveguide antenna.

5. The system as in claim 1 wherein said receive antenna is a multi-channel slotted strip-line antenna.

6. The system as in claim 1 wherein said scanned direction is vertical.

7. The system as in claim 6 wherein said perpendicular direction is azimuthal.

8. The system as in claim 1 wherein the transmit antenna is a variable frequency millimeter wave single channel wave guide antenna operating in the 78 GHz to 81 Ghz spectral range to produce a scanning range of 10 degrees and a scanning rate of 60 Hz.

9. The system as in claim 8 wherein the receive antenna is a multi-channel strip-line antenna also operating in the 78 GHz to 81 GHz spectral range.

10. The system as in claim 9 wherein said system is configured to provide at least 190 pixel resolution in the azimuthal direction.

* * * * *